3,386,698
FREEZING TRAY
Bruce S. Albright, Dayton, Ohio, assignor to General Motors Corporation, Detroit, Mich., a corporation of Delaware
Filed Mar. 28, 1966, Ser. No. 537,850
7 Claims. (Cl. 249—131)

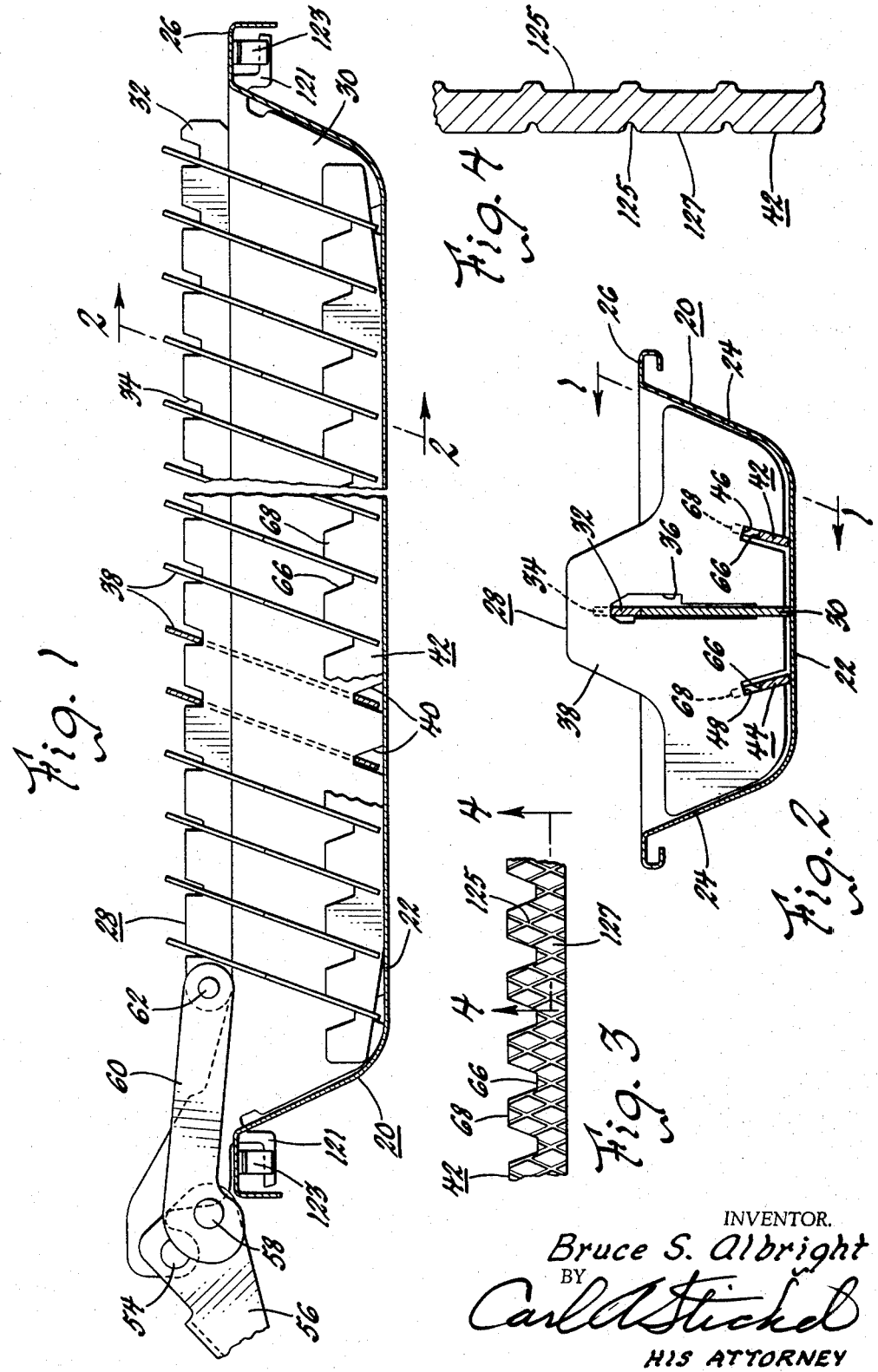

This invention pertains to a freezing tray which will provide cracked frozen liquid, especially cracked ice.

Many people do not have ice cube crushers to prepare ice for drinks. Some attempts have been made to provide freezing trays with movable grids which will provide cracked ice. However, it was found that these earlier grids were difficult to operate and the pieces of frozen liquid or ice tended to adhere to the grid after cracking.

It is an object of this invention to provide a freezing tray with a grid and breaker bars having a surface which insures an easy free release and better breaking of the frozen liquid or ice into particles which are loosened from the grid and readily removed.

It is another object of this invention to provide such a tray and grid which can be readily operated over a receiving receptacle without incurring any possibility of disassembly.

These and other objects are attained in the form shown in the drawings in which the grid has an upper longitudinally movable bar on top of the lower longitudinal partition wall. This upper bar is provided with upwardly facing notches of progressively increasing width from the front to the rear thereof. These notches are comparatively close together and support the upper ends of a series of substantially identical closely spaced transverse walls, each having central upright aligned slots through which extend the upper bar and the lower wall. These transverse walls are supported with their lower edges above the bottom of the container pan.

According to my invention, each of these transverse walls have open ended slots diverging upwardly from their lower edges toward the side edges. Breaker bars rectangular in cross section and notched along the upper edges, fit in these notches and normally rest on the bottom of the container pan. Preferably, the flat sides of these breaker bars are provided with a pattern forming a multitude of spaced apart recurring macroscopic depressions therein imparting an undulating pattern surface thereto. The bars as well as the entire grid are coated with a water repellent non-metallic material bonded in a coextensive layer thereon. The partition walls engage the notches and the teeth formed between the notches imbed in the frozen liquid. When the upper bar is moved forward to progressively move the transverse walls, the frozen liquid is broken free from the grid into small pieces which are readily removed with the assistance of the pattern surface and the coating and the tilted position of the breaker bars.

Further objects and advantages of the present invention will be apparent from the following description, reference being had to the accompanying drawings wherein preferred embodiments of the present invention are clearly shown.

In the drawings:

FIGURE 1 is an upright longitudinal sectional view through a freezing tray embodying one form of my invention;

FIGURE 2 is a transverse sectional view taken along the lines 2—2 of FIGURE 1;

FIGURE 3 is a fragmentary side view illustrating one form of the patterned surface upon one of the breaker bars; and, FIGURE 4 is a sectional view taken along the line 4—4 of a portion of FIGURE 3.

Referring now to the drawing, there is shown a freezing tray 20 having a bottom 22 with flaring sides 24 extending outwardly at an angle of about 70° from the horizontal. The pan or tray also has an upper rim 26 and preferably, has its interior coated with polytetrafluoroethylene. In addition to this, the pan 20 is anodized and coated with the coating material disclosed in Patent 3,016,719, issued Jan. 16, 1962. Within the pan 20 is an ejector grid 28 including a lower longitudinal partition wall 30 resting upon the bottom 22 of the tray 20. The upper portion of the longitudinal partition wall is provided by a longitudinally movable rectangular bar 32 which rides upon the top of the lower portion 30 and is longitudinally movable relative thereto. This bar 32 is provide with a plurality of closely spaced inwardly facing notches 34 in its upper surface which have a progressively increasing width from front to rear. The upper and lower longitudinal wall portions 30 and 32 extend through an irregular center vertical slot 36 in each of the transverse partition walls 38. The webs at the upper end of the slots 36 of the walls 38 each rest in a separate notch 34 in the bar 32 which is sufficiently elevated by the wall 30 to raise the bottom edges of the transverse walls 38 a sufficient distance above the bottom of the tray 22 so that they will not scrape during the movement thereof. The bottom of the lower longitudinal wall portion 30 is provided with a series of equally spaced notches 40, each of which receives the web of one of the partition walls 38 at the lower end of the upright slot 36.

To break and crack the frozen liquid or ice in the pan upon forward movement of the longitudinal bar 32 and the progressive movement of the upper portion of the transverse walls 38, I add to the grid 28 two longitudinally extending breaker bars 42 and 44 which tilt outwardly at an angle which is less than the angle of flare of the side walls 24 for easy removal of the particles. This outward angle of tilt for example, may be about 75° from the horizontal or 15° from the vertical. These breaker bars 42 and 44 extend through notches 46 and 48 in each of the transverse walls 38 which are open at the bottom and are tilted outwardly at the same angle as the bars 42 and 44. These bars 42 and 44 are generally rectangular in cross section and are provided with a series of uniformly spaced notches 66 in their upper edges which receive the portion of the partition walls 38 immediately above. Between the notches are the teeth 68 which, upon freezing of the liquid, become imbedded in the frozen liquid. These bars 42 and 44 are held laterally by the slots 46 and 48 and exert a lateral or shear stress upon the ice because of their tilted position, to increase the cracking thereof. They, however, normally rest upon the bottom 22 of the pan, obviously below the liquid level therein. At the front end of the lower longitudinal partition wall portion 30 there is riveted by the rivet 54, a manual actuator 56. This actuator is connected by a rivet 58, a link 60, and a third rivet 62 to the upper bar 32. The grid 28 is normally held in the tray 20. This is accomplished through the provision of downwardly extending offset projections 121 at each end of the lower longitudinal wall portion 30 extending through slots in the rim 26 and held in place by transverse springs 123 extending between the projections 121 and the rim 26.

To further improve the breakage and free release of the particles from the grid, the flat sides of the breaker bars 42 and 44 are provided with a multitude of spaced apart regularly occurring macroscopic depressions 125 therein forming a part of an undulated patterned surface 127. If desired, this surface may be like that illustrated in Patent 3,033,008, issued May 8, 1962. These bars are coated with a water repellent non-metallic material bonded in a co-extensive layer thereon on non-uniform thickness as occasioned by the undulations and macroscopic depressions in the wall surfaces. This material preferably is of the type disclosed in Patent 3,016,719, issued Jan. 16, 1962. The entire grid is also coated with this material.

After the liquid is frozen in the tray or container pan 20, the pan is inverted over a bucket or receptacle and the actuator operated to pull the longitudinal bar 42 forwardly to progressively move the adjacent portions of the transverse walls 38 forwardly. The movement of the transverse walls 38 through the interengagement of their notches with the breaker bars imparts a slight lateral and longitudinal movement to the breaker bars 42 and 44. The co-action between the transverse walls 38, the ice, the breaker bars 42 and 44 and the pan 20 causes lateral shear stresses and other breaking stresses in the ice which breaks the ice or frozen liquid into small pieces which, by the flaring sides of the pan 20 and the lesser angle of the breaker bars 42 and 44, facilitates the falling of the broken particles and/or ice into the bucket or receptacle. The patterned surface of the breaker bars 42 and 44 as well as the teeth 68 on the upper surface thereto and the angular position of the breaker bars assist in the breakage and release of the particles. They also assist in making more easy the operation of the actuator which accomplishes the breakage.

While the embodiments of the present invention as herein disclosed, constitute preferred forms, it is to be understood that other forms might be adopted.

What is claimed is as follows:

1. A freezing tray including a container pan adapted to contain liquid to be frozen, a grid for dividing the interior of the pan comprising a longitudinal wall and spaced movable transverse walls, and bars extending longitudinally beneath said liquid provided with a multitude of reoccurring macroscopic depressions therein imparting an undulated patterned surface thereto.

2. A freezing tray including a container pan adapted to contain liquid to be frozen, a grid for dividing the interior of the pan comprising a longitudinal wall and spaced movable transverse walls, and bars extending longitudinally beneath said liquid, said bars being rectangular in shape and resting upon and contacting said pan.

3. A freezing tray as defined in claim 1 in which said bars are coated with a water repellant non-metallic material bonded in a coextensive layer thereon for contacting the liquid.

4. A freezing tray as defined in claim 1 in which said bars have generally flat sides provided with said macroscopic depressions.

5. A freezing tray as defined in claim 2 in which said pan has a bottom and sloping side walls extending upwardly and outwardly at an angle, said bars resting upon and contacting the bottom of said pan and being tilted from the vertical at a lesser angle than the side walls of said pan.

6. A freezing tray as defined in claim 2 in which said bars are provided with a series of notches.

7. A freezing tray as defined in claim 2 in which said bars are provided with a series of notches along their upper edge.

References Cited
UNITED STATES PATENTS

| | | | |
|---|---|---|---|
| 2,232,651 | 2/1941 | Binford | 249—72 |
| 3,033,008 | 5/1962 | Davis | 249—131 X |
| 3,093,980 | 6/1963 | Frei | 249—69 |

J. HOWARD FLINT, JR., *Primary Examiner.*